United States Patent
Adir et al.

(10) Patent No.: US 8,516,229 B2
(45) Date of Patent: Aug. 20, 2013

(54) TWO PASS TEST CASE GENERATION USING SELF-MODIFYING INSTRUCTION REPLACEMENT

(75) Inventors: Allon Adir, Kiryat Tivon (IL); Brad Lee Herold, Austin, TX (US); John Martin Ludden, Essex Junction, VT (US); Pedro Martin-de-Nicolas, Austin, TX (US); Charles Leverett Meissner, Austin, TX (US); Gil Eliezer Shurek, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 12/700,970

(22) Filed: Feb. 5, 2010

(65) Prior Publication Data

US 2011/0197049 A1    Aug. 11, 2011

(51) Int. Cl.
*G06F 9/44* (2006.01)

(52) U.S. Cl.
USPC ........... 712/227; 712/234; 712/236; 712/244; 717/124; 717/146; 717/148; 717/151; 717/153; 717/154; 717/155; 717/159

(58) Field of Classification Search
None
See application file for complete search history.

(56) References Cited

U.S. PATENT DOCUMENTS

| | | | | |
|---|---|---|---|---|
| 3,909,802 A | * | 9/1975 | Cassarino et al. | 712/226 |
| 4,607,332 A | * | 8/1986 | Goldberg | 714/6.13 |
| 5,247,627 A | * | 9/1993 | Murakami et al. | 712/236 |
| 5,274,815 A | * | 12/1993 | Trissel et al. | 712/226 |
| 5,471,593 A | * | 11/1995 | Branigin | 712/235 |
| 5,692,167 A | * | 11/1997 | Grochowski et al. | 712/226 |
| 5,770,894 A | * | 6/1998 | Agarwal | 717/149 |
| 5,826,073 A | * | 10/1998 | Ben-Meir et al. | 712/226 |
| 5,850,553 A | * | 12/1998 | Schlansker et al. | 717/155 |
| 5,920,716 A | * | 7/1999 | Johnson et al. | 717/141 |
| 6,023,758 A | * | 2/2000 | Kodama et al. | 712/220 |
| 6,173,395 B1 | * | 1/2001 | Wisor et al. | 712/236 |

(Continued)

FOREIGN PATENT DOCUMENTS

EP    0926592 B1    4/2004

OTHER PUBLICATIONS

Wikipedia's article on 'Control Flow' from Dec. 18, 2008 discloses self-modifying code being used to affect control flow.*

(Continued)

*Primary Examiner* — Steven Snyder
(74) *Attorney, Agent, or Firm* — Mitch Harris, Atty at Law, LLC; Andrew M. Harris; Matthew W. Baca

(57) ABSTRACT

A test code generation technique that replaces instructions having a machine state dependent result with special redirection instructions provides generation of test code in which state dependent execution choices are made without a state model. Redirection instructions cause execution of a handler than examines the machine state and replaces the redirection instruction with a replacement instruction having a desired result resolved in accordance with the current machine state. The instructions that are replaced may be conditional branch instructions and the result a desired execution path. The examination of the machine state permits determination of a branch condition for the replacement instruction so that the next pass of the test code executes along the desired path. Alternatively, the handler can execute a jump to the branch instruction, causing immediate execution of the desired branch path. The re-direction instructions may be illegal instructions, which cause execution of an interrupt handler that performs the replacement.

20 Claims, 4 Drawing Sheets

(56) References Cited

U.S. PATENT DOCUMENTS

| | | | | |
|---|---|---|---|---|
| 6,748,583 B2* | 6/2004 | Aizenbud-Reshef et al. | 717/127 |
| 7,010,787 B2* | 3/2006 | Sakai | 717/159 |
| 7,058,925 B2* | 6/2006 | Ball et al. | 717/106 |
| 7,168,009 B2* | 1/2007 | Darringer et al. | 714/38.1 |
| 7,180,867 B2* | 2/2007 | Hoch et al. | 370/244 |
| 7,197,586 B2* | 3/2007 | DeWitt et al. | 710/260 |
| 7,290,255 B2* | 10/2007 | DeWitt et al. | 717/158 |
| 7,401,322 B1* | 7/2008 | Shagam et al. | 717/128 |
| 7,886,132 B2* | 2/2011 | Rangan et al. | 712/220 |
| 8,250,556 B1* | 8/2012 | Lee et al. | 717/159 |
| 2003/0145286 A1* | 7/2003 | Pajak et al. | 716/1 |
| 2004/0103410 A1* | 5/2004 | Sakai | 717/146 |
| 2005/0081104 A1* | 4/2005 | Nikolik | 714/38 |
| 2005/0086455 A1* | 4/2005 | DeWitt et al. | 712/227 |
| 2005/0154812 A1* | 7/2005 | DeWitt et al. | 710/260 |
| 2007/0271553 A1* | 11/2007 | Higgins et al. | 717/136 |
| 2008/0034357 A1* | 2/2008 | Gschwind | 717/149 |
| 2008/0189528 A1* | 8/2008 | Robinson | 712/226 |
| 2009/0158260 A1* | 6/2009 | Moon et al. | 717/133 |
| 2009/0287908 A1* | 11/2009 | Rangan et al. | 712/206 |
| 2009/0288063 A1* | 11/2009 | Rangan et al. | 717/106 |
| 2011/0078424 A1* | 3/2011 | Boehm et al. | 712/234 |
| 2011/0099431 A1* | 4/2011 | Almog et al. | 714/45 |

OTHER PUBLICATIONS

Wikipedia's article on 'Self-modifying code' from Feb. 20, 2010 discloses self-modifying code being a way to alter a compare and branch to an unconditional branch.*

Bertolino, Antonia,"Automatic Generation of Path Covers Based on the Control Flow Analysis of Computer Programs", IEEE Transactions on Software Engineering, Dec. 1994, pp. 885-899, vol. 20, No. 12, IEEE Press, US.

* cited by examiner

TWO PASS TEST CASE GENERATION USING SELF-MODIFYING INSTRUCTION REPLACEMENT

This invention was made with Government support under HR0011-07-9-0002 awarded by the Defense Advanced Research Projects Agency (DARPA). The Government has certain rights to this invention.

BACKGROUND OF THE INVENTION

1. Field of the Invention

The present invention is related to test program generation by functional exercisers, and more specifically to a test case generator generating code that self-modifies to replace an instruction during a first pass of a test case.

2. Description of Related Art

Functional exercisers that generate random test code streams for testing processor integrated circuits (ICs), and for verifying designs that should have the same machine behavior as other processors, generally include a test code generator of one of two types: reference model test code generators, or consistency-checking test code generators. Consistency-checking test code generators typically do not use a reference model and generate random code streams, including random branch directions, since the state of the machine is not known when the code stream is generated in order to control the direction of a branch. An exerciser having a consistency-checking test code generator compares the behavior of a processor in response to the generated program code to the results from other processors, to determine whether a processor is functionally sound. As an alternative, consistency-checking test code generators can use predesigned code and data sequences to control branch direction. However, the use of predesigned code and data sequences limits the flexibility of the exerciser compared to purely random branch direction generation and also increase complexity of the test code generator.

A reference model test code generator includes a model of the processor (machine model) and therefore the state of the machine is known at the time of generating a branch instruction. Therefore, the direction of the branch is known and the generated test case can be designed to more completely explore the potential machine state and execution space of the processor.

Each of the test program generation strategies described above has advantages and disadvantages. The consistency-checking technique requires stored data for comparison or multiple passes and there is no absolute control of the branch directions generated. Therefore, a larger number of test cases may be required compared to an exerciser that includes a reference model test case generator. The reference model test case generator is inherently more complex and requires processing resources to track the state of the machine throughout the progress of the generated code stream. Therefore, fewer test cases can be generated in the same amount of time, even though less test cases may be required to test the processor as fully as a given amount of randomly branching test cases.

In addition, there are other instructions besides branches that may have state dependencies that it is desirable both test exhaustively and to control to reduce the amount of test cases that must be executed. For such instructions, the same exerciser criteria, advantages and disadvantages may apply.

Therefore, it would be desirable to provide a test case generator for generating a code stream that provides greater control over the test case generation without greatly increasing complexity and overhead in the test code generation.

BRIEF SUMMARY OF THE INVENTION

The invention is embodied in a processor, computer system, computer program product and method that generate test code streams for testing a processor, which may be used in a functional exerciser. The method is a method of operation of the computer system and the computer program product is a set of program instructions embodied in tangible form in computer readable storage media such as optical, magnetic or electrical removable or non-removable memory.

The method generates an output set of program code by replacing a particular instruction, which may be a branch instruction or other state-dependent instruction, with a redirecting instruction for redirecting execution to a handling routine. When the redirection instruction is reached the handling routine is entered. The handling routine determines a state of the processor such that a desired result of the particular instruction is selected by specifying a replacement instruction having the desired result when executed and replacing the redirection instruction with the replacement instruction. For example, a branch instruction may be selected and written in place of the redirection instruction that directs execution along a desired path. The program code is then re-executed, either immediately or on a next iteration, so that the replacement instruction generates the desired result when executed.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to methods and programs for implementing functional exercisers that are used to evaluate processor designs and test processor ICs. Rather than randomly insert machine-state-dependent instructions such as conditional branch instructions and rather than simulating the machine design of a processor to track the machine state in order to selectively place the machine-state-dependent instructions, a special redirection instruction is placed in a generate test case stream of program code. During execution the redirection instruction causes execution to enter a handling routine that then overwrites the redirection instruction with the machine-state-dependent instruction selected according to the current machine state which is know during execution of the test case. The special redirection instruction may be, for example, an illegal op-code and the corresponding handling routine the interrupt handler for the illegal op-ode exception interrupt. After the test case code stream has been patched by overwriting the redirection instruction, execution is either directed to the patched location, causing immediate execution of the selected machine-state-dependent instruction, or execution is directed to the next instruction that would be executed after the selected machine-state-dependent instruction, so that the selected machine-state-dependent instruction is executed on a next iteration through the corresponding portion of the test case.

Figure 1:
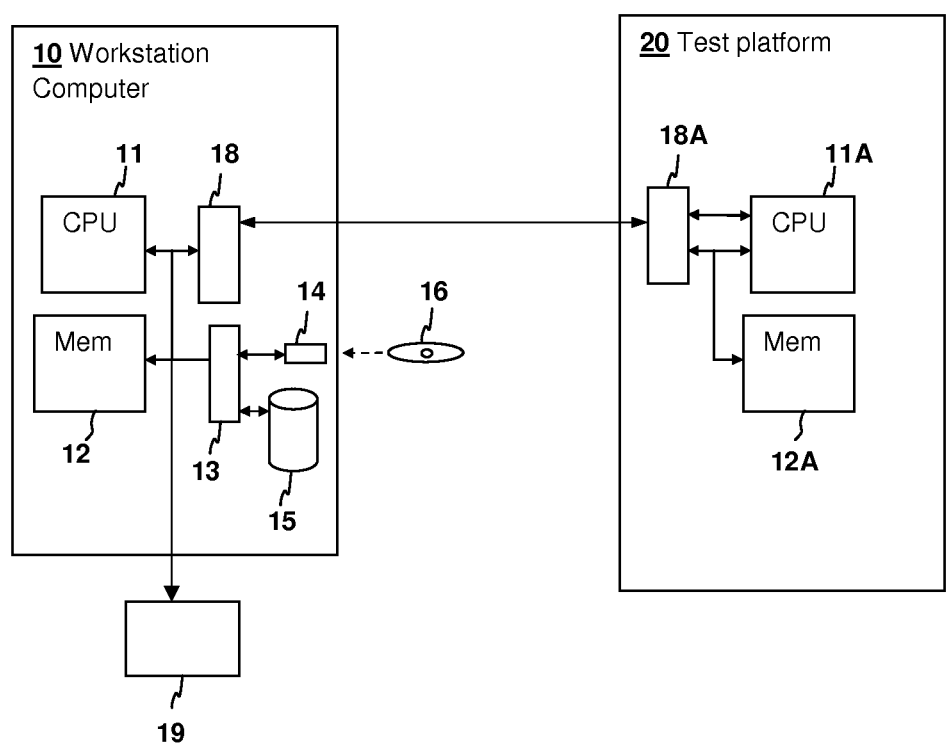
FIG. 1 is a block diagram illustrating a processing system in which program code according to an embodiment of the present invention is generated and executed.

Referring now to FIG. 1, a system for generating and executing program code in accordance with an embodiment of the present invention is shown. The depicted computer system includes a workstation 10 coupled to a test platform 20. The depicted computer system configuration is illustrative, and processing systems in accordance with other embodiments of the present invention include dedicated exerciser systems in which the processor generating the test cases is integrated in the test platform, and other systems in which the processor generating the test cases may be used to execute the test cases, for example, when evaluating conditions in legacy designs that are long in production. A processor 11 is coupled to a memory 12, which contains program instructions implementing a test code generator for generating program code streams for execution by a processor 11A in test platform 20, by transferring the test cases to memory 12A coupled to processor 11A in test platform 20. Processor 11 in workstation computer 10 is coupled to a storage interface 13, which couples processor 11 and memory 12 to storage devices such as hard disc drive 15 and an optical drive 14. Embodiments of the invention include computer program products that contain the test code generator of the present invention stored in memory 12 as well as stored on tangible media such as a CD-ROM 16 that may be inserted into optical drive 14 to transfer the test code generator and other software components of the functional exerciser to memory 12 for execution by processor 11. The illustrated processing system also includes input/output (I/O) interfaces and devices 19 such as mice and keyboards for receiving user input and graphical displays for displaying information, such as user interfaces for controlling and examining the results of test code execution within test platform 20. While the system of FIG. 1 is used to provide an illustration of a system for generating program code for testing processor and execution of the test program code in accordance with the present invention, it is understood that a functional exerciser in accordance with an embodiment of the present invention may be executed by another general-purpose or special-purpose computer system that does not include the architectural features described in further detail below. Further it is understood that the target processor executing the test cases generated by the functional exerciser may be a processor within any type of system, including processors coupled to a wafer tester.

Workstation computer system 10 is coupled to test platform 20 by an interface 18 that couples to interface 18A through a wired, optical or wireless connection that may be proprietary, or take the form of a standardized serial or parallel bus such as an Ethernet connection. Interface 18A also includes control logic responsive to commands sent from workstation computer system 10 that control the loading of test code streams into memory 12A, and initiation and control of the execution of the test code streams by processor 11A, which may include clock and reset control circuits among other circuits that provide for observation of the external state of processor 11A.

Figure 2:
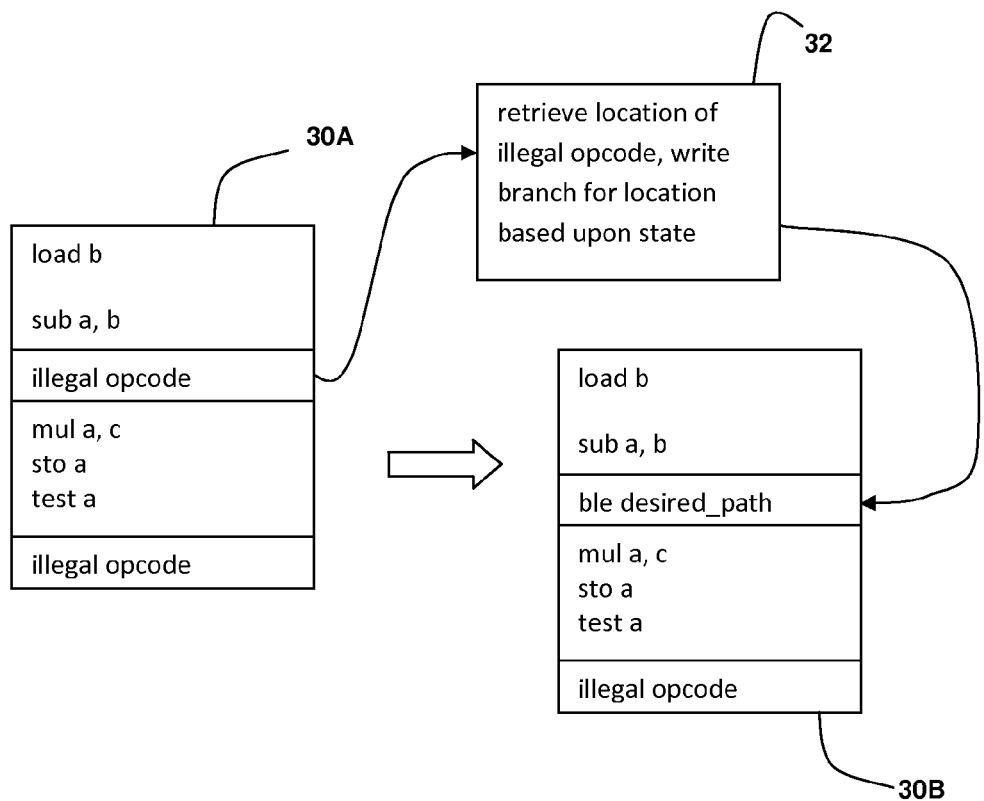
FIG. 2 is a memory diagram illustrating program code generated and modified in accordance with an embodiment of the present invention.

Referring now to FIG. 2, details of a test case instruction stream generated by a program within workstation computer system 10 in accordance with an embodiment of the invention are shown as loaded into memory 12A of test platform 20, along with details of the execution of the program within test platform 20. Within memory 12A, an initial memory image 30A contains the following program:

```
load b
sub a,b
illegal op-code
mul a, c
sto a
test a
illegal op-code
```

The illegal opcodes have been placed at locations where a machine-state-dependent instructions, such as conditional branches, were originally generated or indicated for generation by the test code generator, but in the present invention are replaced with an instruction that redirects execution of the test cases to a special handler routine 32, which is also located within memory 12A in the exemplary illustration. In the specific example above, the handler routine 32 is part of or called by an interrupt service routine that handles at least an exception interrupt caused by the illegal instructions. The handler routine writes a machine-state-dependent instruction to the locations previously occupied by the illegal instructions as each illegal instruction is executed. One advantage of using an exception, such as the illegal op-codes of the above example, is that the handler will be entered automatically in supervisor mode, which affords some protection from any instabilities introduced by execution of the test code, and further provides some information about the location and flags associated with the change from user mode. E.g., the location of the illegal instruction can be ascertained from the exception information in some architectures, without requiring additional information provided from the test code generator. However, use of an exception or entry into supervisory mode is not a requirement of the present invention. Also, other sorts of instructions or instruction/operand combinations that generate traps to supervisory mode may be used as an alternative, such as access to illegal memory locations.

The reason that redirection instructions, such as the illegal instructions of the above example, are used, is that while the test case generator program executing within workstation computer system 10 is generating the test case, the state of processor 11A when each of the illegal instructions are encountered is not known, because for speed and simplicity, a machine state model of the processor is not maintained or generated by the test code generator. However, within test platform 20, when handler 32 is reached, the machine state of processor 11A is known, because the state of processor 11A at entry to handler 32, with the exception of the interrupt condition, is the machine state that the test case generator would have needed to select the proper machine-state-dependent instruction, such as a particular branch condition. Therefore, handler 32 can determine which branch instruction is needed for execution in a particular direction, which might be specified by the particular illegal instruction or an operand supplied therewith and overwrite initial memory image 30A to generate modified memory image 30B. Then, handler 32 can transfer control to the location of the modified instruction, e.g., instruction ble path in memory image 30B to follow the desired execution at location path, or handler 32 may jump directly to location path. The value of path may also be specified in some manner such as an operand supplied with the illegal instructions, or the illegal opcode itself. Alternatively, handler 22 may receive a table of replacement instructions for each of the illegal instructions that is stored elsewhere in memory 12A and retrieve the values needed for instruction replacement from the table, or a table of general code generation directives may be used. The table(s) can be generated by the test code generator at the time the illegal instructions are placed, and will generally have a one-to-one correspondence between each illegal instruction encountered in execution order and the entries in the table.

As an alternative to interrupt generation, a test code stream in accordance with another embodiment of the present invention may take the following form, for the example of the program given for memory image 30A described above:

```
load b
sub a,b
jmp handler
mul a, c
sto a
test a
jmp handler
``` where the jump instructions cause entry to the handler routine, which can then replace the jump instructions with the conditional branches or other machine-state-dependent instructions specified by the test code generator.

Figure 3:
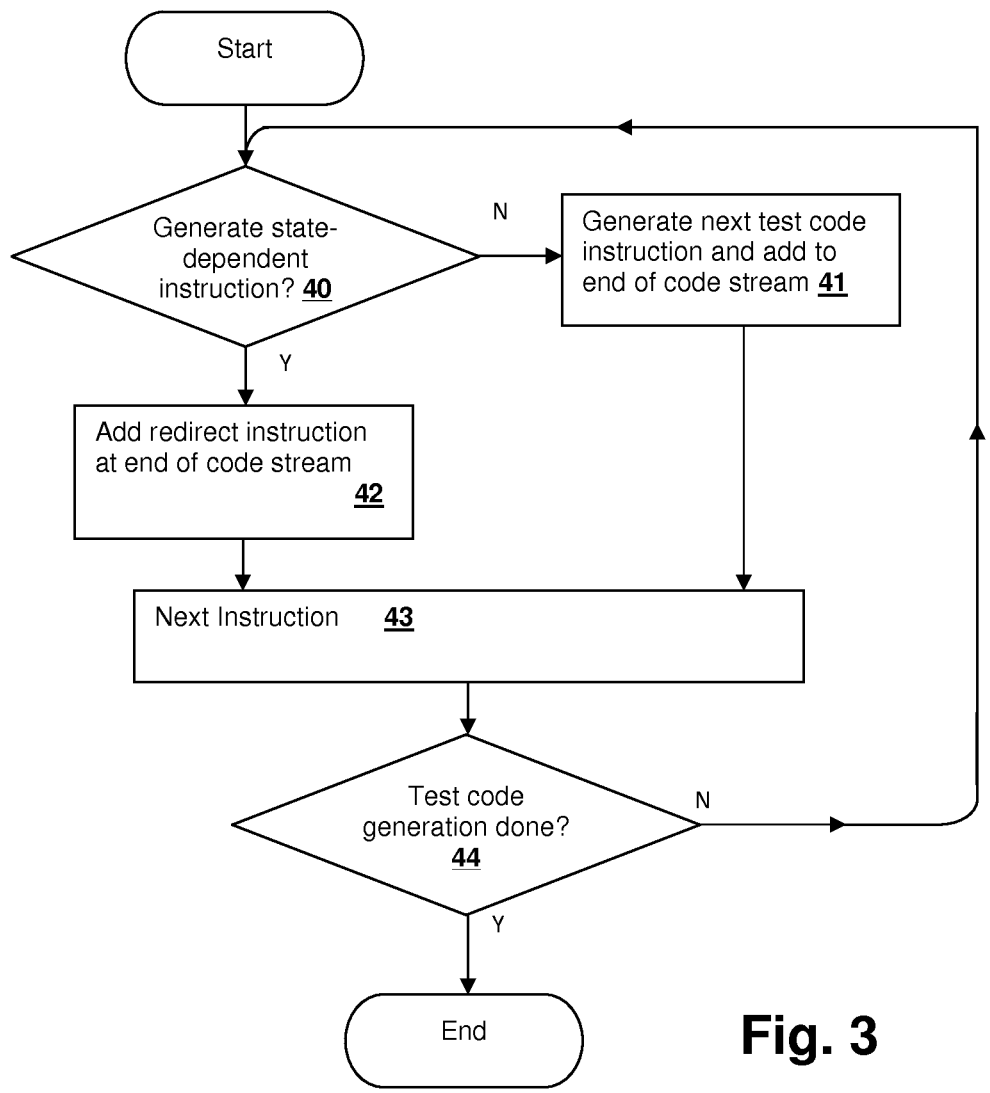
FIG. 3 is a flow chart depicting a method in accordance with an embodiment of the present invention.

Referring now to FIG. 3, a method for generating program code in accordance with an embodiment of the present invention is shown. If the next instruction being generated is a machine state-dependent instruction, resolution of which is being held until runtime (decision 40), a redirection instruction, such as the illegal instructions described above is inserted at the next location in the output code stream (step 42), otherwise the next test code instruction is generated and added to the end of the code stream (step 41). Until the test code generation is complete (decision 44), the algorithm moves on to the next instruction in the code stream (step 43). If test code generation is complete (decision 44), the generating ends. While the method illustrated in FIG. 3 provides an example of how to generate test code in accordance with an embodiment of the present invention, other techniques may be employed as well, in accordance with other embodiments of the present invention. For example, an entire test case code stream may be generated and then parsed for certain machine-state-dependent instructions such as conditional branches. The conditional branches are then replaced with the redirection instructions.

Figure 4:
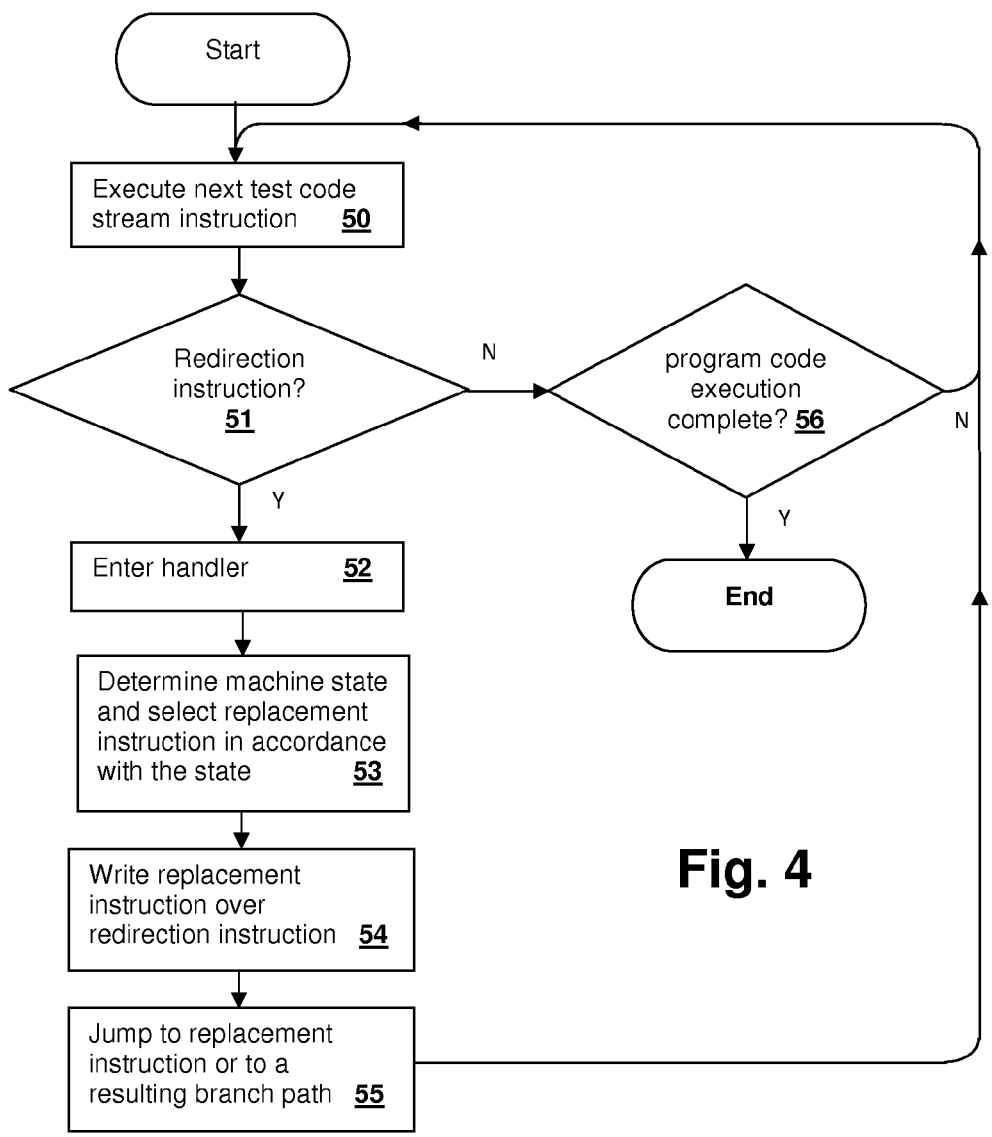
FIG. 4 is a flow chart depicting a method in accordance with another embodiment of the present invention.

Referring now to FIG. 4, a method of executing program code in accordance with an embodiment of the present invention is shown. Until a redirection instruction is reached (decision 51), or execution of the test program code is complete (decision 56), the next instruction in the test code stream is executed (step 50). When a redirection instruction is reached (decision 51), the handler is entered (step 52). In the handler, the machine state is determined and the replacement instruction is selected in accordance with the determined machine state (step 53). Next, the replacement instruction is written over the redirection instruction (step 54) and execution is resumed in the test code stream by jumping to the replacement instruction or a resulting branch path (step 55). Once execution of the test program code is complete (decision 56), the execution terminates.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer performed method performed by a general-purpose computer system that generates an output set of program code for execution by a processor, the method comprising:
generating the output set of program code by replacing a particular instruction in the output set of program code with a redirecting instruction for redirecting execution to a handling routine, wherein the particular instruction is an instruction having a result dependent on a machine state of the processor;
executing the program code, wherein when the redirecting instruction is executed, the handling routine is entered;
determining, within the handling routine, a state of the processor such that a desired result of the particular instruction resulting from execution of the particular instruction is selected by specifying a replacement instruction having the desired result when executed;
responsive to the determining, and within the handling routine, replacing the redirection instruction with the replacement instruction; and
re-executing the program code, whereby the replacement instruction produces the desired result when executed.

2. The computer performed method of claim 1, wherein the particular instruction is a branch instruction, wherein the determining determines the state of the processor such that a desired direction resulting from execution of the branch instruction can be selected by specifying a replacement branch instruction having a specified branch instruction condition that produces the desired direction as a result, wherein the replacing replaces the redirection instruction with the replacement branch instruction having the specified branch instruction condition, and wherein the re-executing thereby directs execution along the desired direction at the replacement branch instruction.

3. The computer performed method of claim 2, further comprising subsequent to the replacing, executing a jump to a next instruction after the replacement branch instruction in the desired direction, and wherein the re-executing re-executes the program code after completing a current iteration.

4. The computer performed method of claim 2, further comprising subsequent to the replacing, executing a jump to the replacement branch instruction, whereby the re-executing re-executes the program code during a current iteration.

5. The computer performed method of claim 1, wherein the redirecting instruction causes an interrupt, and wherein the handling routine is an interrupt handler corresponding to the interrupt.

6. The computer performed method of claim 5, wherein the interrupt is a trap interrupt that causes a transition to a supervisor mode.

7. The computer performed method of claim 1, further comprising communicating information about a decision made by the generating to the handling routine, and wherein the determining by the handling routine further uses the communicated information in selecting the replacement instruction.

8. A computer system comprising a processor for executing program instructions coupled to a memory for storing the program instructions, wherein the program instructions are program instructions for generating an output set of program code for execution by a processor, wherein the program instructions comprising:
- program instructions for generating the output set of program code by replacing a particular instruction in the output set of program code with a redirecting instruction for redirecting execution to a handling routine, wherein the particular instruction is an instruction having a result dependent on a machine state of the processor;
- program instructions for directing execution of the program code, wherein when the redirecting instruction is executed, the handling routine is entered;
- program instructions for determining, within the handling routine, a state of the processor such that a desired result of the particular instruction resulting from execution of the particular instruction is selected by specifying a replacement instruction having the desired result when executed;
- program instructions for, responsive to the determining, and within the handling routine, replacing the redirection instruction with the replacement instruction; and
- program instructions for directing re-execution of the program code, whereby the replacement instruction produces the desired result when executed.

9. The computer system of claim 8, wherein the particular instruction is a branch instruction, wherein the program instructions for determining determine the state of the processor such that a desired direction resulting from execution of the branch instruction can be selected by specifying a replacement branch instruction having a specified branch instruction condition that produces the desired direction as a result, wherein the program instructions for replacing replace the redirection instruction with the replacement branch instruction having the specified branch instruction condition, and wherein the program instructions for directing re-execution of the program code thereby direct execution along the desired direction at the replacement branch instruction.

10. The computer system of claim 9, wherein the program instructions further comprise program instructions for subsequent to the replacing, executing a jump to a next instruction after the replacement branch instruction in the desired direction, and wherein the program instructions for directing re-execution of the program code the program code are executed after completing a current iteration.

11. The computer system of claim 9, wherein the program instructions further comprise program instructions within the handler for, subsequent to executing the program instructions for replacing, executing a jump to the replacement branch instruction, whereby the program instructions for directing re-execution of the program code are executed during a current iteration.

12. The computer system of claim 8, wherein the redirecting instruction causes an interrupt, and wherein the handling routine is an interrupt handler corresponding to the interrupt.

13. The computer system of claim 12, wherein the interrupt is a trap interrupt that causes a transition to a supervisor mode.

14. The computer system of claim 8, wherein the program instructions further comprise program instructions for communicating information about a decision made by the generating to the handling routine, and wherein the program instructions for determining within the handling routine further use the communicated information in selecting the replacement instruction.

15. A computer program product comprising a non-transitory computer-readable storage device storing program instructions for execution by a general-purpose computer system, wherein the program instructions are program instructions for generating an output set of program code for execution by a processor, wherein the program instructions comprising program instructions for:
- generating the output set of program code by replacing a particular instruction in the output set of program code with a redirecting instruction for redirecting execution to a handling routine, wherein the particular instruction is an instruction having a result dependent on a machine state of the processor;
- directing execution of the program code, wherein when the redirecting instruction is executed, the handling routine is entered;
- determining, within the handling routine, a state of the processor such that a desired result of the particular instruction resulting from execution of the particular instruction is selected by specifying a replacement instruction having the desired result when executed;
- responsive to the determining, and within the handling routine, replacing the redirection instruction with the replacement instruction; and
- directing re-execution of the program code, whereby the replacement instruction produces the desired result when executed.

16. The computer program product of claim 15, wherein the particular instruction is a branch instruction, wherein the program instructions for determining determine the state of the processor such that a desired direction resulting from execution of the branch instruction can be selected by specifying a replacement branch instruction having a specified branch instruction condition that produces the desired direction as a result, wherein the program instructions for replacing replace the redirection instruction with the replacement branch instruction having the specified branch instruction condition, and wherein the program instructions for directing re-execution of the program code thereby direct execution along the desired direction at the replacement branch instruction.

17. The computer program product of claim 16, wherein the program instructions further comprise program instructions for subsequent to the replacing, executing a jump to a next instruction after the replacement branch instruction in the desired direction, and wherein the program instructions for directing re-execution of the program code are executed after completing a current iteration.

18. The computer program product of claim 16, wherein the program instructions further comprise program instructions for subsequent to the replacing, executing a jump to the replacement branch instruction, whereby the program instructions for directing re-execution of the program code are executed during a current iteration.

19. The computer program product of claim 15, wherein the redirecting instruction causes an interrupt, and wherein the handling routine is an interrupt handler corresponding to the interrupt.

20. The computer program product of claim 15, wherein the program instructions further comprise program instructions for communicating information about a decision made by the generating to the handling routine, and wherein the program instructions for determining within the handling routine further use the communicated information in selecting the replacement instruction.

* * * * *